United States Patent
Ahmed et al.

(10) Patent No.: US 7,483,589 B2
(45) Date of Patent: Jan. 27, 2009

(54) METHOD FOR COPYING OBJECTS

(75) Inventors: Mohamed Nooman Ahmed, Louisville, KY (US); Brian Edward Cooper, Lexington, KY (US); Michael Earl Lhamon, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 798 days.

(21) Appl. No.: 11/005,962

(22) Filed: Dec. 7, 2004

(65) Prior Publication Data
US 2006/0119902 A1 Jun. 8, 2006

(51) Int. Cl.
G06K 9/60 (2006.01)
G06T 3/00 (2006.01)

(52) U.S. Cl. ............... 382/282; 382/284; 382/295; 358/1.18; 358/450

(58) Field of Classification Search ........... 358/1.15, 358/1.18, 488, 505, 1.12, 449, 450, 451, 358/453; 382/293–308, 176, 282, 284, 386; 345/619–689
See application file for complete search history.

(56) References Cited

U.S. PATENT DOCUMENTS

| 5,293,475 | A | | 3/1994 | Hennigan et al. | |
|---|---|---|---|---|---|
| 5,973,692 | A | * | 10/1999 | Knowlton et al. | 715/835 |
| 6,111,667 | A | * | 8/2000 | Mishima et al. | 358/488 |
| 6,373,590 | B1 | * | 4/2002 | Ancin et al. | 358/1.18 |
| 6,415,306 | B2 | | 7/2002 | Seaman | |
| 6,430,320 | B1 | * | 8/2002 | Jia et al. | 382/289 |
| 6,603,493 | B1 | | 8/2003 | Lovell et al. | |
| 2002/0051208 | A1 | * | 5/2002 | Venable | 358/1.18 |
| 2002/0101626 | A1 | * | 8/2002 | Pandipati | 358/505 |
| 2002/0150311 | A1 | | 10/2002 | Lynn | |
| 2003/0163786 | A1 | | 8/2003 | Shields | |
| 2003/0222921 | A1 | | 12/2003 | Rummel | |
| 2004/0019850 | A1 | | 1/2004 | Purvis et al. | |
| 2004/0174563 | A1 | * | 9/2004 | Cassidy et al. | 358/1.18 |
| 2005/0024681 | A1 | * | 2/2005 | Tehrani et al. | 358/1.18 |
| 2006/0088214 | A1 | * | 4/2006 | Handley et al. | 382/176 |

FOREIGN PATENT DOCUMENTS

WO WO 01/82231 A2 * 11/2001

OTHER PUBLICATIONS

Bansal et. al., "New Approximability and Inapproximabiliy results for 2-dimensional bin packing", Proceedings of the fifteenth annual ACM-SIAM symposium on Discrete algorithms, Session 2B, 2004, pp. 196-203.*

(Continued)

*Primary Examiner*—Andrew W Johns
(74) *Attorney, Agent, or Firm*—Taylor & Aust, PC

(57) ABSTRACT

A method for copying objects smaller than a background defined by a scanner of an apparatus includes scanning a plurality of objects to acquire image data associated with the plurality of objects and the background; cropping the image data to remove object data for each object of the plurality of objects from the background; determining a size associated with each object of the plurality of objects, based on the object data; and formatting a page to produce a compact arrangement of multiple objects of the plurality of objects on the page, the page receiving the multiple objects in accordance with the size.

31 Claims, 4 Drawing Sheets

OTHER PUBLICATIONS

Two-dimensional packing problems: A survey by Andrea Lodi, Silvano Martello, Michele Monaci, European Journal of Operational Research 141 (2002) pp. 241-252.

Bin Packing Explained, by Heidi Smith, www.cs.cf.ac.uk/user/C.L. Mumford/heidi/Background.html.

Bin Packing, www.cs.arizona.edu/icon/odsends/bpack/bpack.htm.

Multi-Capacity Bin Packing Algorithms with Applications to Job Scheduling under Multiple Contraints. William Leinberger, George Karypis, Vipin Kumar, Department of Computer Science and Engineering, University of Minnesota, TR 99-024: Draft May 27, 1999, pp. 1-23.

Approximation of Two-Dimensional Rectangle Packing, Pinhong Chen, Yan Chen, Mudit Goel, Freddy Mang, CS270 Project Report, Spring 1999, pp. 1-11.

* cited by examiner

APPLEBEE'S

910 Beaumont Ctre. Pkwy.
Lexington, KY 40513
(606) 224-1166

DANNY G                   TB#063
DATE: 06-09-04 TIME: 22:26 GUESTS: 4

1 LG KILLIANS        4.29
  1 BLUE CHZ SIR      11.49
******* GUEST # 4   SUB-TOTAL:   16.73

Check TOTAL:   15.78
       TAX:    0.95
Total Due:            16.73

Duplicate #   1

SO YOU DON'T HAVE TIME TO EAT OUT??
WE ARE NOW OFFERING CURBSIDE CARRYOUT
       IT'S NOT FAST FOOD.....
    .....IT'S APPLEBEE'S FOOD, FAST
HALF PRICE APPETIZERS AND BAR DRINKS
3PM TO 7PM & DOLLAR OFF DRINKS 10-C
       SHOTS ARE NOT DISCOUNTED

******************************************
DATE 06/11/04                  TIME 13:00
MID 800000889581

Logan's Roadhouse
           Lexington KY
         Gratuity not included
       Thank you for your patronage

AMEX         *********51017    S 12/04
AUTH 595998    TABLE    45  CHECK 9575

PURCHASE        DINING        ASHLEY S

AMOUNT                           11.68
TAX                               0.70
                     --------------------
     SUBTOTAL    $       12.38

TIP    $......2.00

TOTAL    $......14.38
                     ===========
         CUSTOMER COPY
******************************************

McDonald's Corporation
Thank you for eating at McDonald's

3765 PALLOMAR CENTER
LEXINGTON, KY 40513

THANK YOU

MCDONALD'S           TEL#     8592238811
79 KS#03    S#2     Jun.05'04(Sat)12:07
STORE# 11583                SEQ# 0114
MER# KRC1257234001

Order #379              TO GO

1 MC-CHICKEN                    1.00
  1 DBLCH BURGER                  1.00
  2 BIG MAC 4FML                  5.90
  2 COKE 21 OZ                    2.00
  1 DIET COKE 21 OZ               1.00

SUB TOTAL                        10.90
TAKE OUT TAX                      0.65

11.55

AMOUNT TENDERED                  11.55
CHANGE                            0.00

TRANSACTION TOTAL AMOUNT         11.55

CARD ISSUER   ACCOUNT #      EXP DATE
AM.EXP. SALE  *************1017    11.55

AUTHORIZATION CODE - 500086

METHOD FOR COPYING OBJECTS

BACKGROUND OF THE INVENTION

1. Field of the Invention

The present invention relates to copying operations, and, more particularly, to a method for copying objects, particularly small objects, such as for example, receipts.

2. Description of the Related Art

Copying of receipts is common for travel reimbursement, taxes and other purposes. Cash register and credit card receipts are commonly two inches to three inches wide, with varying lengths. It is good practice to make an electronic or paper copy of original receipts before submission for rebates or for reimbursement. Copying of these receipts can be a tedious task. One feels compelled to minimize wasted paper by placing and aligning multiple receipts on the scanner/copier bed for duplication. Typically, several attempts are required because the receipts seldom lay flat and tend to shift to overlap adjacent receipts or shift out of the scan area when the cover is lowered on the scanner/copier. Trimming the receipts with scissors and taping them down onto a sheet of paper is usually the last resort, but this wastes time.

SUMMARY OF THE INVENTION

The present invention provides a method for copying small objects, such as for example, receipts.

The invention, in one exemplary embodiment, is directed to a method for copying objects smaller than a background defined by a scanner of an apparatus, including scanning a plurality of objects to acquire image data associated with the plurality of objects and the background; cropping the image data to remove object data for each object of the plurality of objects from the background; determining a size associated with each object of the plurality of objects, based on the object data; and formatting a page to produce a compact arrangement of multiple objects of the plurality of objects on the page, the page receiving the multiple objects in accordance with the size.

The invention, in another exemplary embodiment, is directed to a method for copying a plurality of receipts, including scanning, in at least one scanning operation, a plurality of receipts to acquire image data associated with the plurality of receipts and a background; cropping the image data to remove object data for each receipt of the plurality of receipts from the background; determining a size associated with each receipt of the plurality of receipts, based on the object data; and formatting a page to produce a compact arrangement of multiple receipts of the plurality of receipts on the page, the page receiving the multiple receipts in accordance with the size.

An advantage of the present invention, in one embodiment, is that it provides a convenient solution to minimize a user's time and effort for copying and/or electronically archiving small objects, such as receipts, photographs and small notes.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is an exemplary depiction of a plurality of objects to be scanned by a scanner.

FIG. 4 is an exemplary depiction of a page including the plurality of objects of FIG. 3 after cropping and formatting.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
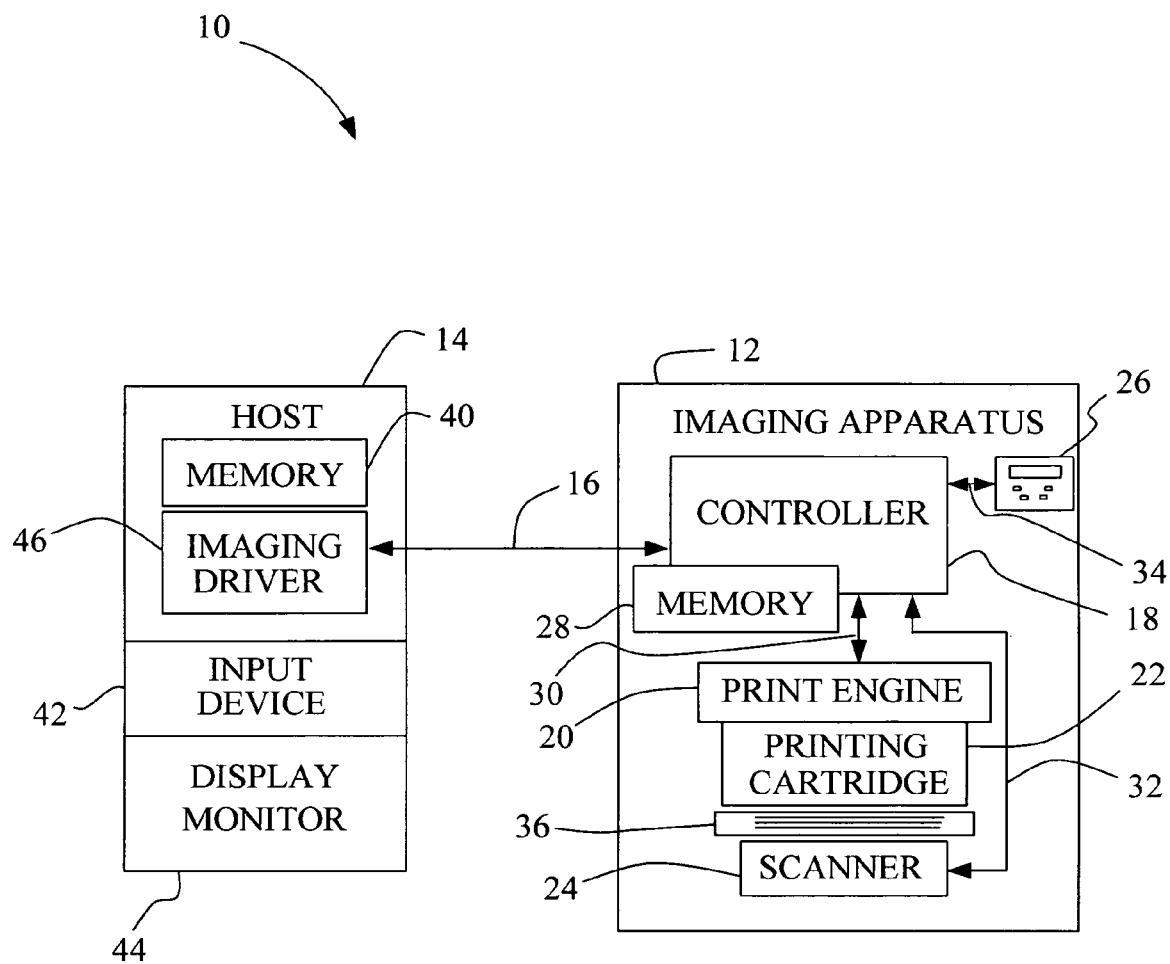
FIG. 1 is a diagrammatic depiction of an imaging system that utilizes the present invention.

Referring now to the drawings and particularly to FIG. 1, there is shown a diagrammatic depiction of an imaging system 10 embodying the present invention. Imaging system 10 includes an imaging apparatus 12 and a host 14. Imaging apparatus 12 communicates with host 14 via a communications link 16. As used herein, the term "communications link" is used to generally refer to structure that facilitates electronic communication between two components, and may operate using wired or wireless technology.

Imaging apparatus 12 can be, for example, an ink jet printer and/or copier, an electrophotographic printer and/or copier, a thermal transfer printer and/or copier, or an all-in-one (AIO) unit that includes a print engine, a scanner, and possibly a fax unit. An AIO unit is also known in the art as a multifunction machine. For example, as shown in FIG. 1, imaging apparatus 12 includes a controller 18, a print engine 20, a printing cartridge 22, a scanner 24, and a user interface 26. Imaging apparatus 12 may communicate with host 14 via a standard communication protocol, such as for example, universal serial bus (USB) or Ethernet.

Controller 18 includes a processor unit and associated memory 28, and may be formed as one or more Application Specific Integrated Circuits (ASIC). Memory 28 may be, for example, random access memory (RAM), read only memory (ROM), and/or non-volatile RAM (NVRAM). Alternatively, memory 28 may be in the form of a separate electronic memory (e.g., RAM, ROM, and/or NVRAM), a hard drive, a CD or DVD drive, or any memory device convenient for use with controller 18. Controller 18 may be a printer controller, a scanner controller, or may be a combined printer and scanner controller. In the present embodiment, controller 18 communicates with print engine 20 via a communications link 30. Controller 18 communicates with scanner 24 via a communications link 32. User interface 26 is communicatively coupled to controller 18 via a communications link 34. Controller 18 serves to process print data and to operate print engine 20 during printing, as well as to operate scanner 24 and process image data obtained via scanner 24.

In the context of the examples for imaging apparatus 12 given above, print engine 20 can be, for example, an ink jet print engine, an electrophotographic print engine or a thermal transfer engine, configured for forming an image on a substrate 36, such as a sheet of paper, transparency or fabric. As an ink jet print engine, for example, print engine 20 operates printing cartridge 22 to eject ink droplets onto substrate 36 in order to reproduce text and/or images. As an electrophotographic print engine, for example, print engine 20 causes printing cartridge 22 to deposit toner onto substrate 36, which is then fused to substrate 36 by a fuser (not shown), in order to reproduce text and/or images.

Scanner 24 is a conventional scanner, such as for example, a sheet feed or flat bed scanner. As is known in the art, a sheet feed scanner transports a sheet to be scanned past a stationary sensor device. In a flat bed scanner, the sheet or object to be scanned is held stationary, and a scanning bar including a sensor is scanned over the stationary sheet or object. In the context of the present invention, either scanner type may be used, but the flat bed scanner is somewhat preferred, since multiple small objects may be placed on the document holder of the flat bed scanner for scanning during a single scan.

Host 14, which may be optional, may be, for example, a personal computer, including memory 40, such as RAM, ROM, and/or NVRAM, an input device 42, such as a keyboard, and a display monitor 44. Host 14 further includes a processor, input/output (I/O) interfaces, and at least one mass data storage device, such as a hard drive, a CD-ROM and/or a DVD unit.

Host 14 includes in its memory a software program including program instructions that function as an imaging driver 46, e.g., printer/scanner driver software, for imaging apparatus 12. Imaging driver 46 is in communication with controller 18 of imaging apparatus 12 via communications link 16. Imaging driver 46 facilitates communication between imaging apparatus 12 and host 14, and may provide formatted print data to imaging apparatus 12, and more particularly, to print engine 20, to print an image.

In some circumstances, it may be desirable to operate imaging apparatus 12 in a standalone mode. In the standalone mode, imaging apparatus 12 is capable of functioning without host 14. Accordingly, all or a portion of imaging driver 46, or a similar driver, may be located in controller 18 of imaging apparatus 12 so as to accommodate printing during a copying or facsimile job being handled by imaging apparatus 12 when operating in the standalone mode.

Figure 2:
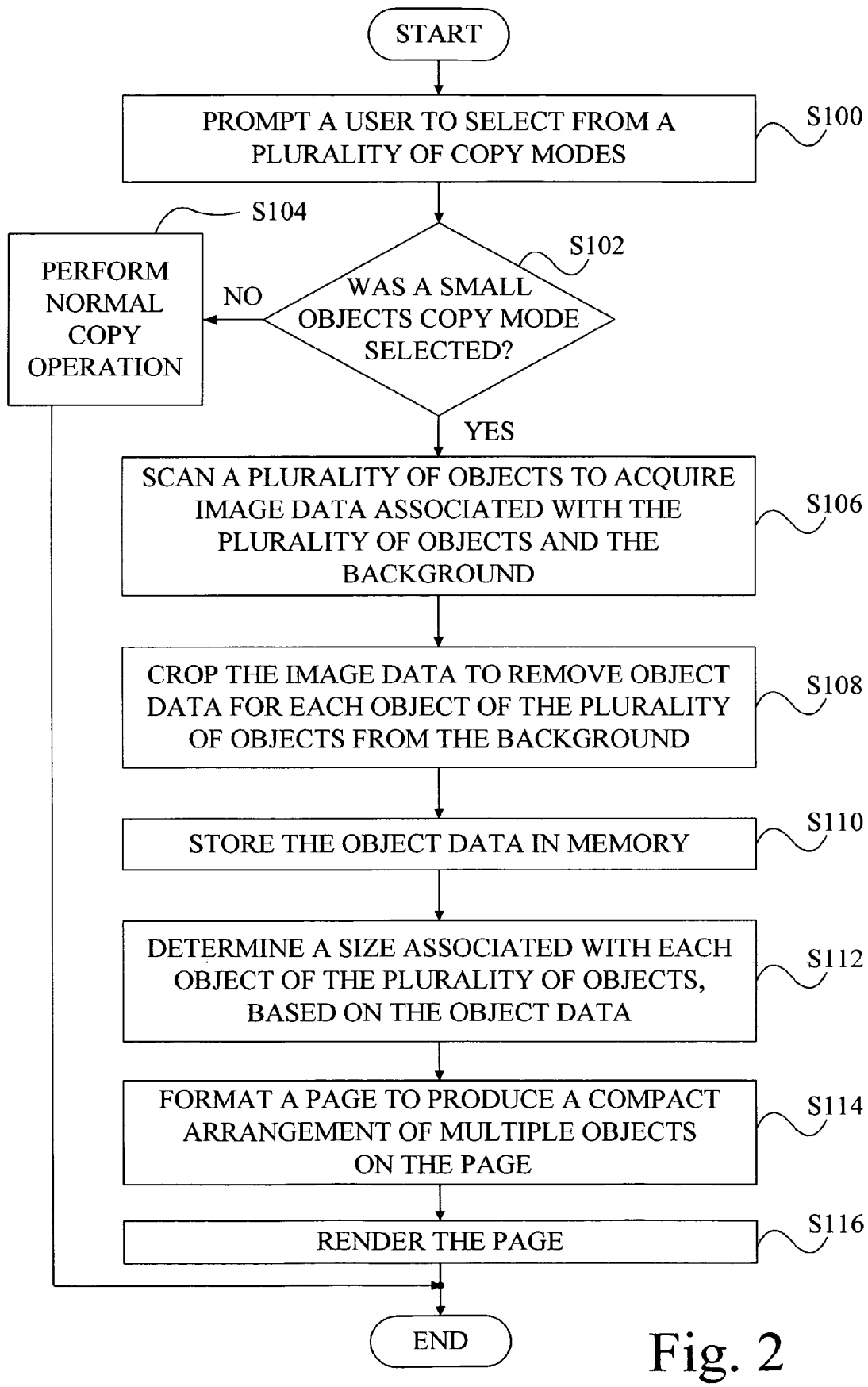
FIG. 2 is a flowchart depicting a method for copying small objects, in accordance with an embodiment of the present invention.

A method of the present invention for copying small objects, as depicted in the flowchart of FIG. 2, will now be described with further reference to FIGS. 1, 3 and 4. The method may be performed by imaging apparatus 12, such as an AIO unit, i.e., multifunction machine, either in a standalone mode or when operating in conjunction with host 14. The steps of the flowchart of FIG. 2 may be performed by program instructions executed by controller 18 of imaging apparatus 12, or alternatively, by host 14 in conjunction with imaging apparatus 12.

At step S100, a user is prompted to select from a plurality of copy modes. The user may be prompted via user interface 26 of imaging apparatus 12, or alternatively, by display monitor 44 of host 14. The plurality of copy modes may include, for example, a NORMAL copy mode and a SMALL OBJECTS copy mode. Those skilled in the art will recognize that the SMALL OBJECTS copy mode may be combined with other copy modes, if desired. Further, the user may select whether the objects are to be scanned in color, gray scale, or black and white. The user may further select the copy resolution, such as for example 150, 300, 400 or 600 dots per inch (dpi).

At step S102, it is determined whether the SMALL OBJECTS copy mode has been selected.

A NORMAL copy mode may be used, for example, to copy an original on an A4 sheet of paper. A SMALL OBJECTS copy mode may be used, for example, to copy receipts, photographs, small notes, airline tickets, or similar small objects. In one embodiment, for example, each object may be a receipt, so that a rendered page may include a copy of a multitude of receipts. In another embodiment, for example, each object may be a photograph, so that a rendered page may include a plurality of photographs. In still another embodiment, the objects may be a combination of objects having different characteristics, so as to form an eclectic collection of objects.

If the result of step S102 is NO, then process proceeds to step S104, wherein a NORMAL copy operation is performed by imaging apparatus 12. If the result of step S102 is YES, the process proceeds to step S106 to begin performing a SMALL OBJECTS copy operation.

Figure 3:
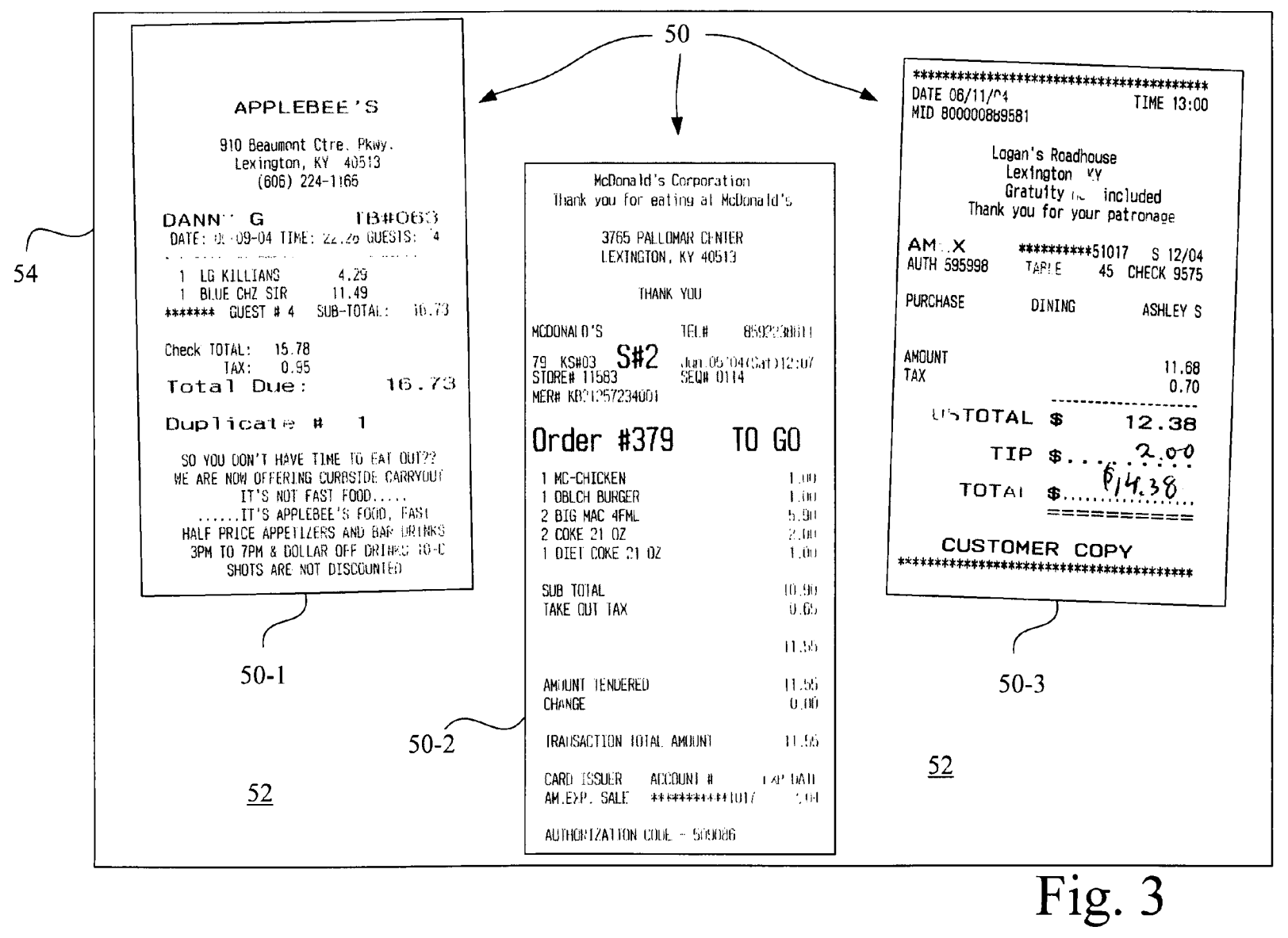

At step S106, with reference to FIG. 3, a plurality of objects 50, e.g., receipts, individually identified as object 50-1, object 50-2 and object 50-3, are scanned by scanner 24 to acquire image data associated with the plurality of objects 50 and a background 52. The background 52 may be defined, at least in part, by an imaging window 54 of scanner 24. The act of scanning may be a single scan, or a plurality of scans performed over a period of time. It is to be recognized that the plurality of objects 50 may include a plurality of subgroups of objects, each subgroup including at least one object. For example, objects 50-1, 50-2 and 50-3 may form one subgroup of a larger plurality of objects. Accordingly, the act of scanning may be a single scan of the plurality of objects 50, or alternatively, the act of scanning may be a plurality of scans over time, with each scan directed to a different subgroup of a larger plurality of objects, and wherein each subgroup may be a single object or multiple objects. In the case of the use of subgroups and multiple scans, the scanning acquires image data associated with each subgroup, e.g., objects 50-1, 50-2, 50-3, and the background, e.g., background 52.

Optionally, during, or after, the scanning operation, the image data may be down-sampled to reduce an amount of data associated with the object or objects being scanned. Down sampling may occur at a variety of ratios, as desired. For example, a ratio of 4:1 may be adequate for 600 dpi scans for some objects, such as receipts. Down sampling may be useful to limit the amount of computation in the method steps that follow below by reducing the amount of image data being processed.

At step S108, the image data is cropped, such as for example electronically, to remove object data for each object of the plurality of objects from the background. During the cropping process, the data associated with the background is separated from the object data and is discarded. Where multiple objects are scanned on the same scan, the cropping process also includes segmenting the multiple objects into individual objects.

If the object is a receipt, for example, the act of cropping may include distinguishing an area of the receipt, e.g., object 50-1, from the background 52, such that the object data only includes data corresponding to the area of the receipt.

As another example, the act of cropping may include distinguishing a printed area of the receipt, e.g., object 50-1, from a non-printed area adjacent that printed area, as well as the background 52 defined by scanner 24, such that the background is considered to include the non-printed area of the receipt. This advantageously further reduces the amount of data required to represent the printed matter in the printed area of the receipt by discarding the data that may be associated with the non-printed area of the receipt. If desired, a boundary box may be formed around the printed area of the receipt, such that in this example, the area within the boundary box may be considered to be included within the printed area.

Cropping may be achieved, for example, as follows. The image data resulting from the scanning operation of step S106 undergoes a thresholding process to separate the object data from the background. An adaptive thresholding technique may be used to accomplish this step. The following algorithm, in which the intensity distribution is assumed to be bimodal, may be used to select the threshold automatically:

a) Select an initial threshold T.
b) Segment the document image using threshold T. This produces two groups of pixels: $G_1$ consisting of all pixels with values greater than threshold T, and $G_2$ consists of all pixels with values less than or equal to threshold T.
c) Compute the average values $\mu_1$ and $\mu_2$ for the two groups $G_1$ and $G_2$.
d) Compute a new threshold value.

$$T = \frac{1}{2}(\mu_1 + \mu_2)$$

e) Repeat steps b through d until the difference between successive iterations is smaller than a predefined parameter $T_o$.

Next, the connected components, e.g., connected pixels, are extracted from the data obtained during the thresholding process. One exemplary method to extract connected pixels is to use binary morphology. Starting with a seed pixel p in the binary image I, the following iterative algorithm will yield all pixels connected to p:

$$X_k = (X_{k-1} \oplus B) \cap I \text{ where } X_0 = p$$

$\oplus$ refers to a binary dilation operation and B is a 3×3-structuring element $$B = \begin{bmatrix} 1 & 1 & 1 \\ 1 & 1 & 1 \\ 1 & 1 & 1 \end{bmatrix}$$

This extraction algorithm is repeated until all connected components are extracted, thereby forming what is referenced above as object data. Those skilled in the art will recognize that other methods known in the art may be used to extract all connected components.

At step S110, which may be optional, the object data of each of objects 50-1, 50-2 and 50-3 is stored in memory, such as for example, memory 28 of imaging apparatus 12 or memory 40 of host 14. As such, the object data associated with objects 50 may be thought of for convenience as blocks of image data.

At step S112, a size associated with each object of the plurality of objects is determined, based on the object data. The size, for example, may be associated with the physical size of each object. For example, a height and/or length may be determined for each block of image data.

At step S114, a page is formatted to produce a compact arrangement of multiple objects of the plurality of objects on the page. For example, the page may receive the multiple objects of the plurality of objects in accordance with the size of the object or objects. Also, for example, the formatting step may, in some embodiments, maximize a coverage area of the page.

The act of formatting may include de-skewing the object data with respect to the page, which may occur during or after scanning, as depicted by comparing an orientation of objects 50-1, 50-2 and 50-3 as shown in FIG. 3 with the orientation of the same objects as shown in FIG. 4. Further, the act of formatting may include scaling a particular object corresponding to particular object data to a selected physical size, as depicted by comparing a size of objects 50-1, 50-2 and 50-3 as shown in FIG. 3 with the same objects shown in FIG. 4.

In the example, as shown in FIG. 4, after extracting the object data for each object 50-1, 50-2, 50-3 of the multiple objects that have been scanned, each block of object data is arranged onto a page. The goal is to arrange or pack all of the object data corresponding to the plurality of objects into the fewest number of bins, e.g., pages. In the simplest case, i.e., single-dimensional bin packing, there is a single measurement, such as length, associated with each object. In single-dimensional bin packing, each bin has the same, fixed length. For two-dimensional bin packing, there are two independent measurements (such as width and height) associated with each object. In two-dimensional bin packing each bin, e.g., page, has the same fixed two-dimensional size as any other bin. In general, a measurement vector is associated with each object and bin. The bin size is fixed, and it is assumed that a bin is large enough to hold any single object.

In one embodiment, such as when only a single scan of multiple objects 50-1, 50-2, 50-3 is conducted, the objects may be arranged by the process of step S114 immediately as they arrive ("on-line"). In another embodiment, such as when multiple scans of different objects is conducted, the object data may be collected, stored, and possibly sorted before packing the bin, e.g, packing the page ("off-line").

In another embodiment, a blend of the on-line and off-line approaches is used. In this blended approach, object data corresponding to individual objects, e.g., objects 50-1, 50-2, and 50-3, is collected until their total area exceeds the area of a page. For convenience, the object data corresponding to an individual object is referred to as an object data block, and a plurality of object data blocks will be referred to as a set of object data blocks. The set of object data blocks is sorted by non-increasing height. The object data blocks are then arranged according to a fit algorithm, such as a first-fit decreasing height algorithm. However, whereas conventional packing approaches arrange objects starting at the bottom of the bin, the present embodiment arranges objects starting from the top, since this is typically more natural to the user.

An object data block corresponding to a particular object is placed at the top left of the current level, which initially is the top of the page (bin). Each subsequent object data block corresponding to a subsequent object will be placed on the highest level on which it can fit, from left-to-right. Once the current left-to-right level is full, a new level will be created beneath it, placed at the maximum height of the blocks above it, as shown in FIG. 4.

If the new level is too low, so that it would force the next object data block to extend beyond the bottom of the page, then this object data block will be kept in storage in memory, such as in memory 28 of imaging apparatus 12 or memory 40 of host 14, until the next page is processed. The remaining object data blocks are processed similarly. If object data blocks cannot be placed on the current page, then they will be kept for the next page. Once all of the object data corresponding to the current page has been processed completely, then the page formatting for the current page is completed.

The formatting of the next page of object data blocks is then initialized to contain any remaining object data blocks that could not be placed on the previous page. Additional object data blocks will be included until, again, the total area of the object data blocks exceeds the area of the page. This process will be repeated until no new object data blocks are available.

At step S116, each page is rendered. Rendering the page may occur in a human perceivable form or in an electronic form. For example, the act of rendering in a human perceivable form may include one or both of printing the page by print engine 20 of imaging apparatus 12 and displaying the page on display monitor 44 of host 14.

As a further example, the rendering of a page may occur as an electronic archive, wherein each page of data in a suitable file format, such as for example, a PDF file, TIFF file or some other file format, is stored in memory, such as in memory 28 of imaging apparatus 12 or memory 40 of host 14. When the page is rendered as an electronic archive, for example, a previously stored page of object data may be modified by a user to include additional object data if that object data will fit on the page. Later, if desired, the page represented in the electronic archive may be rendered in a human perceivable form.

As an alternative, the small objects mode may be automatically selected by imaging apparatus 12 based on the image data acquired, for example, in step S106. In this case, the process may exclude steps S100, S102 and S104 described above, and begin directly at step S106.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for copying objects smaller than a background defined by a scanner of an apparatus, comprising:
    scanning a plurality of objects to acquire image data associated with said plurality of objects and said background;
    cropping said image data to remove object data for each object of said plurality of objects from said background;
    determining a size associated with each object of said plurality of objects, based on said object data; and
    formatting a page to produce a compact arrangement of multiple objects of said plurality of objects on said page, said page receiving said multiple objects in accordance with said size.

2. The method of claim 1, further comprising rendering said page in a human perceivable form.

3. The method of claim 2, wherein the act of rendering includes at least one of printing said page on a substrate and displaying said page on a display monitor.

4. The method of claim 1, further comprising rendering said page in an electronic archive.

5. The method of claim 1, wherein the act of scanning includes down-sampling said object data to reduce an amount of data associated with the corresponding object.

6. The method of claim 1, wherein the act of formatting includes de-skewing said object data with respect to said page.

7. The method of claim 1, wherein the act of formatting includes scaling a particular object corresponding to particular object data to a selected physical size.

8. The method of claim 1, wherein each object of said plurality of objects is a receipt.

9. The method of claim 8, wherein the act of cropping includes distinguishing an area of said receipt from said background.

10. The method of claim 8, wherein the act of cropping includes distinguishing a printed area of said receipt from a non-printed area adjacent said printed area, said background being considered to include said non-printed area of said receipt.

11. The method of claim 1, wherein each object of said plurality of objects is a photograph.

12. The method of claim 1, wherein said page forms an eclectic collection of objects.

13. The method of claim 1, wherein said plurality of objects includes a plurality of subgroups of objects, each subgroup including at least one object.

14. The method of claim 13, wherein the act of scanning includes performing a plurality of scans, each scan of said plurality of scans scanning one subgroup of said plurality of subgroups of objects to acquire image data associated with said one subgroup and said background.

15. The method of claim 1, wherein prior to the act of scanning, a user is prompted to select from a plurality of copy modes including a small objects copy mode.

16. The method of claim 15, wherein when said small objects copy mode is selected by said user, said user is prompted to select from a plurality of processing options.

17. The method of claim 16, wherein said plurality of processing options includes storing said page.

18. The method of claim 16, wherein said user is given an option to modify a previously stored page to add additional object data to said previously stored page.

19. The method of claim 1, wherein a small objects copy mode is selected automatically by said apparatus based on said image data.

20. The method of claim 1, wherein the act of formatting is performed for multiple pages if said plurality of objects do not fit on one page.

21. A method for copying a plurality of receipts, comprising:
    scanning, in at least one scanning operation, a plurality of receipts to acquire image data associated with said plurality of receipts and a background;
    cropping said image data to remove object data for each receipt of said plurality of receipts from said background;
    determining a size associated with each receipt of said plurality of receipts, based on said object data; and
    formatting a page to produce a compact arrangement of multiple receipts of the plurality of receipts on said page, said page receiving said multiple receipts in accordance with said size.

22. The method of claim 21, wherein prior to the act of scanning, a user is prompted to select from a plurality of copy modes including a receipts copy mode.

23. The method of claim 22, wherein when said receipts copy mode is selected by a user, said user is prompted to select from a plurality of processing options.

24. The method of claim 23, wherein said plurality of processing options includes storing said page for future rendering.

25. The method of claim 23, wherein said user is given an option to modify a previously stored page to add additional receipt data to said previously stored page.

26. The method of claim 21, wherein the act of cropping includes distinguishing an area of each receipt of said plurality of receipts from said background.

27. The method of claim 21, wherein the act of cropping includes distinguishing a printed area of each receipt of said plurality of receipts from a non-printed area adjacent said printed area, said background being considered to include said non-printed area.

28. The method of claim 21, wherein said plurality of receipts includes a plurality of subgroups of receipts, each subgroup including at least one receipt.

29. The method of claim 28, wherein the act of scanning includes performing a plurality of scans, each scan of said plurality of scans scanning one subgroup of said plurality of subgroups of receipts to acquire image data associated with said one subgroup and said background.

30. The method of claim 29, wherein the act of formatting includes de-skewing said object data for each receipt in said one subgroup.

31. The method of claim 21, wherein the act of formatting includes scaling a particular receipt corresponding to particular object data to a selected physical size on said page.

* * * * *